United States Patent
Palla et al.

(10) Patent No.: US 12,026,224 B2
(45) Date of Patent: Jul. 2, 2024

(54) METHODS, SYSTEMS, ARTICLES OF MANUFACTURE AND APPARATUS TO RECONSTRUCT SCENES USING CONVOLUTIONAL NEURAL NETWORKS

(71) Applicant: Movidius Ltd., Leixlip (IE)

(72) Inventors: Alessandro Palla, Dublin (IE); Jonathan Byrne, Ashbourne (IE); David Moloney, Dublin (IE)

(73) Assignee: Movidius Ltd., Leixlip (IE)

( * ) Notice: Subject to any disclaimer, the term of this patent is extended or adjusted under 35 U.S.C. 154(b) by 776 days.

(21) Appl. No.: 17/100,531

(22) Filed: Nov. 20, 2020

(65) Prior Publication Data
US 2021/0073640 A1 Mar. 11, 2021

Related U.S. Application Data

(63) Continuation of application No. PCT/EP2019/063006, filed on May 20, 2019.
(Continued)

(30) Foreign Application Priority Data

May 20, 2019 (WO) ................ PCT/EP2019/063006

(51) Int. Cl.
G06F 40/00 (2020.01)
G06F 18/00 (2023.01)
(Continued)

(52) U.S. Cl.
CPC ............ *G06F 18/00* (2023.01); *G06F 18/214* (2023.01); *G06F 18/251* (2023.01); *G06N 3/04* (2013.01);
(Continued)

(58) Field of Classification Search
CPC ... G06N 3/04; G06N 3/063; G06N 3/08; G06N 5/022; G06F 18/214; G06F 18/251
See application file for complete search history.

(56) References Cited

U.S. PATENT DOCUMENTS 10,839,260 B1 * 11/2020 Khanna ................. G06F 18/214
11,841,920 B1 * 12/2023 Marsden ................. G06V 40/11
(Continued)

FOREIGN PATENT DOCUMENTS

CN 107464227 A 12/2017
CN 107784151 A 3/2018
(Continued)

OTHER PUBLICATIONS

WikiWikipedia OR Gate (3 pages, archived Oct. 27, 2017 retrieved at https://web.archive.org/web/20171027172318/https://en.wikipedia.org/wiki/OR_gate, 3 pages. (Year: 2017).*
(Continued)

*Primary Examiner* — Barbara M Level
(74) *Attorney, Agent, or Firm* — Hanley, Flight & Zimmerman, LLC (57) ABSTRACT

Methods, apparatus, systems and articles of manufacture to reconstruct scenes using convolutional neural networks are disclosed. An example apparatus includes a sensor data acquirer to acquire ground truth data representing an environment, an environment detector to identify an environmental characteristic of the environment, a synthetic database builder to apply noise to the ground truth data to form a training set, a model builder to train a machine learning model using the training set and the ground truth data, and a model adjustor to modify the machine learning model to include residual OR-gate connections intermediate respective layers of the machine learning model. The synthetic database builder is further to store the machine learning (Continued)

model in association with the environmental characteristic of the environment.

18 Claims, 5 Drawing Sheets

Related U.S. Application Data (60) Provisional application No. 62/674,462, filed on May 21, 2018.

(51) Int. Cl.
  *G06F 18/214* (2023.01)
  *G06F 18/25* (2023.01)
  *G06N 3/04* (2023.01)
  *G06N 3/063* (2023.01)
  *G06N 3/08* (2023.01)
  *G06N 5/022* (2023.01)

(52) U.S. Cl.
  CPC .............. *G06N 3/063* (2013.01); *G06N 3/08* (2013.01); *G06N 5/022* (2013.01)

(56) References Cited

U.S. PATENT DOCUMENTS

| | | | |
|---|---|---|---|
| 2014/0126808 A1* | 5/2014 | Geisler | G06V 10/457 382/275 |
| 2017/0011738 A1 | 1/2017 | Senior et al. | |
| 2018/0106905 A1* | 4/2018 | Hilliges | G06T 19/006 |
| 2019/0050743 A1* | 2/2019 | Chen | G06N 20/20 |
| 2019/0197778 A1* | 6/2019 | Sachdeva | G06V 20/58 |
| 2019/0258907 A1 | 8/2019 | Rezende | |
| 2019/0259134 A1* | 8/2019 | Rainy | G06N 3/045 |
| 2020/0226403 A1* | 7/2020 | Evans | H04N 23/90 |

FOREIGN PATENT DOCUMENTS

| | | |
|---|---|---|
| JP | 2005242803 A | 9/2005 |
| WO | 2018083668 A1 | 5/2018 |
| WO | 2019224164 A1 | 11/2019 |

OTHER PUBLICATIONS

European Patent Office, "Communication Pursuant to Article 94(3) EPC," dated Jan. 24, 2023, in connection with European Patent Application No. 19726936.8, 6 pages.

International Searching Authority, "International Search Report and Written Opinion," issued in connection with International Patent Application No. PCT/EP2019/063006, dated Jul. 12, 2019, 10 pages.

International Bureau, "International Preliminary Report on Patentability," issued in connection with International Patent Application No. PCT/EP2019/063006, dated Nov. 24, 2020, 8 pages.

Palla, Alessandro et al., "Fully convolutional denoising autoencoder for 3D scene reconstruction from a single depth image," Fourth International Conference on Systems and Informatics (ICSAI), IEEE, Nov. 11, 2017, KP033292534, DOI: 10.1109/ICSAI.2017.8248355, 11 pages.

Holstrom, L., et al., "Using Additive Noise in Back-propagation Training," IEEE Transactions on Neural Networks, IEEE Service Center, Piscataway, New Jersey, vol. 3, No. 1, Jan. 31, 1992, XP000262184, ISSN: 1045-9227, DOI: 10.1109/72.105415, 15 pages.

Savarese, Pedro, et al., "Residual Gates: A Simple Mechanism for Improved Network Optimization," Dec. 31, 2017, XP055602561, retrieved from Internet: URL: https://home.ttic.edu/~savarese/savarese_files/Residual_Gates.pdf, retrieved Feb. 1, 2022, 10 pages.

Ohgami, "Body Shape Estimation From Single Depth Image of Clothed Person," IPSJ SIG Technical Report, Jan. 19, 2017, 13 pages. (English Machine Translation).

Japanese Patent Office, "Notice of Reasons for Refusal," issued in connection with Japanese Patent Application No. 2020564387, dated Jul. 18, 2023, 7 pages.

Japanese Patent Office, "Written Opinion," issued in connection with Japanese Patent Application No. 2020-564387, dated Oct. 6, 2023, 12 pages.

Japanese Patent Office, "Decision to Grant a Patent," issued in connection with Japanese Patent Application No. 2020-564387, dated Nov. 28, 2023, 5 pages.

The State Intellectual Property Office of People's Republic of China, "The First Office Action," issued in connection with Chinese Patent Application No. 201980034480.4, dated Apr. 23, 2024, 11 pages. [English Translation Included].

The State Intellectual Property Office of People's Republic of China, "First Search," issued in connection with Chinese Patent Application No. 201980034480.4, dated Apr. 23, 2024, 2 pages.

* cited by examiner

METHODS, SYSTEMS, ARTICLES OF MANUFACTURE AND APPARATUS TO RECONSTRUCT SCENES USING CONVOLUTIONAL NEURAL NETWORKS

RELATED APPLICATION

This application is a bypass continuation of Patent Cooperation Treaty Application No. PCT/EP2019/063006, filed on May 20, 2019, which claims priority to U.S. Provisional Patent Application Ser. No. 62/674,462, filed on May 21, 2018. PCT Application No. PCT/EP2019/063006 and U.S. Provisional Patent Application Ser. No. 62/674,462 are hereby incorporated herein by reference their entireties. Priority to PCT Application No. PCT/EP2019/063006 and U.S. Provisional Patent Application Ser. No. 62/674,462 is hereby claimed.

FIELD OF THE DISCLOSURE

This disclosure relates generally to scene reconstruction, and, more particularly, to methods, systems, articles of manufacture and apparatus to reconstruct scenes using convolutional neural networks.

BACKGROUND

In recent years, image and video data has become abundantly available, particularly with the advent of static cameras (e.g., surveillance cameras) and dynamically moving cameras (e.g., quad-copter cameras, drones, etc.). While the human brain includes an ability to infer objects from a single point of view based on previous experience, one or more voids of captured image and video data may cause problems for machine-based interpretations and/or analysis.

The figures are not to scale. Instead, the thickness of the layers or regions may be enlarged in the drawings.

DETAILED DESCRIPTION

Acquired image data can include errors and/or voids caused by one or more factors. In some examples, errors and/or voids in acquired image data are caused by highly reflective surfaces that saturate image acquisition devices, such as light detection and ranging (LiDAR) systems. In some examples, errors and/or voids are caused by occlusions in a scene, such as trees, vehicles, buildings, etc. In examples disclosed herein, machine learning is used to create one or more models that can be used for processing input sensor data to correct errors in the input data (e.g., voids caused by occlusions in a scene).

Machine learning (ML) and/or artificial intelligence (AI) enables machines (e.g., computers, logic circuits, etc.) to generate an output based on a given input. AI enables a machine to use a model to process the input and generate the output. ML enables the model to be trained such that particular input(s) result in particular output(s). In general, implementing a ML/AI system involves two phases, a learning/training phase and an inference phase. In the learning/training phase, a training algorithm is used to train a model to create a particular output given a particular input based on, for example, training data. In general, the model includes internal parameters that guide how input data is transformed into output data. Additionally, hyperparameters are used as part of the training process to control how the learning is performed (e.g., a learning rate, a number of layers to be used in the machine learning model, etc.). Once trained, other data (e.g., live data) is input to the model in the inference phase to create an output. This inference phase is when the AI is "thinking" to generate the output based on what it learned from the training (e.g., from the model). In some examples, input data undergoes pre-processing before being used as an input to the machine learning model. Moreover, in some examples, the output data may undergo post-processing after it is generated by the AI model to transform the output into a useful result (e.g., an instruction to be executed by the machine).

Many different types of machine learning models and/or machine learning architectures exist. In examples disclosed herein, a convolutional neural network (CNN) model is used. In examples disclosed herein, additional OR-gate structures are added to the machine learning model to reduce false positives (e.g., reducing the likelihood that errors are introduced via the processing of the machine learning model). Using a CNN model enables handling of incoming sensor data of an arbitrary size. However, other model architectures such as, for example, deep neural networks (DNNs), Support Vector Machines (SVMs), etc. may additionally or alternatively be used.

As noted above, ML/AI models are trained to produce a particular output given a particular input. Different types of training may be performed, based on the type of ML/AI model and/or the expected output. For example, supervised training uses inputs and corresponding expected outputs to select parameters (e.g., by iterating over combinations of select parameters) for the ML/AI model that reduce model error.

In examples disclosed herein, ML/AI models are trained using ground truth data (e.g., curated sensor data that is known to not include noise), and ground truth data with added noise. That is, ground truth data with noise added is used as a training input, while the ground truth data (without added noise) is used as the expected output. In examples disclosed herein, training is performed at a central facility (e.g., in a cloud computing environment), but may additionally or alternatively be performed at any other computing environment.

Once training is complete, the model is stored in a database. The database may be at a server location (e.g., in a cloud computing environment). In some examples, the model may be provided to an edge device (e.g., an edge user computer, a drone, an Internet of Things (IoT) device, etc.) The model may then be executed by the server and/or edge device to generate a reconstructed scene. Such an approach is useful in scenarios where a drone is operating in an environment and attempting to perform scene reconstruction for navigation and/or collision avoidance purposes.

Figure 1:
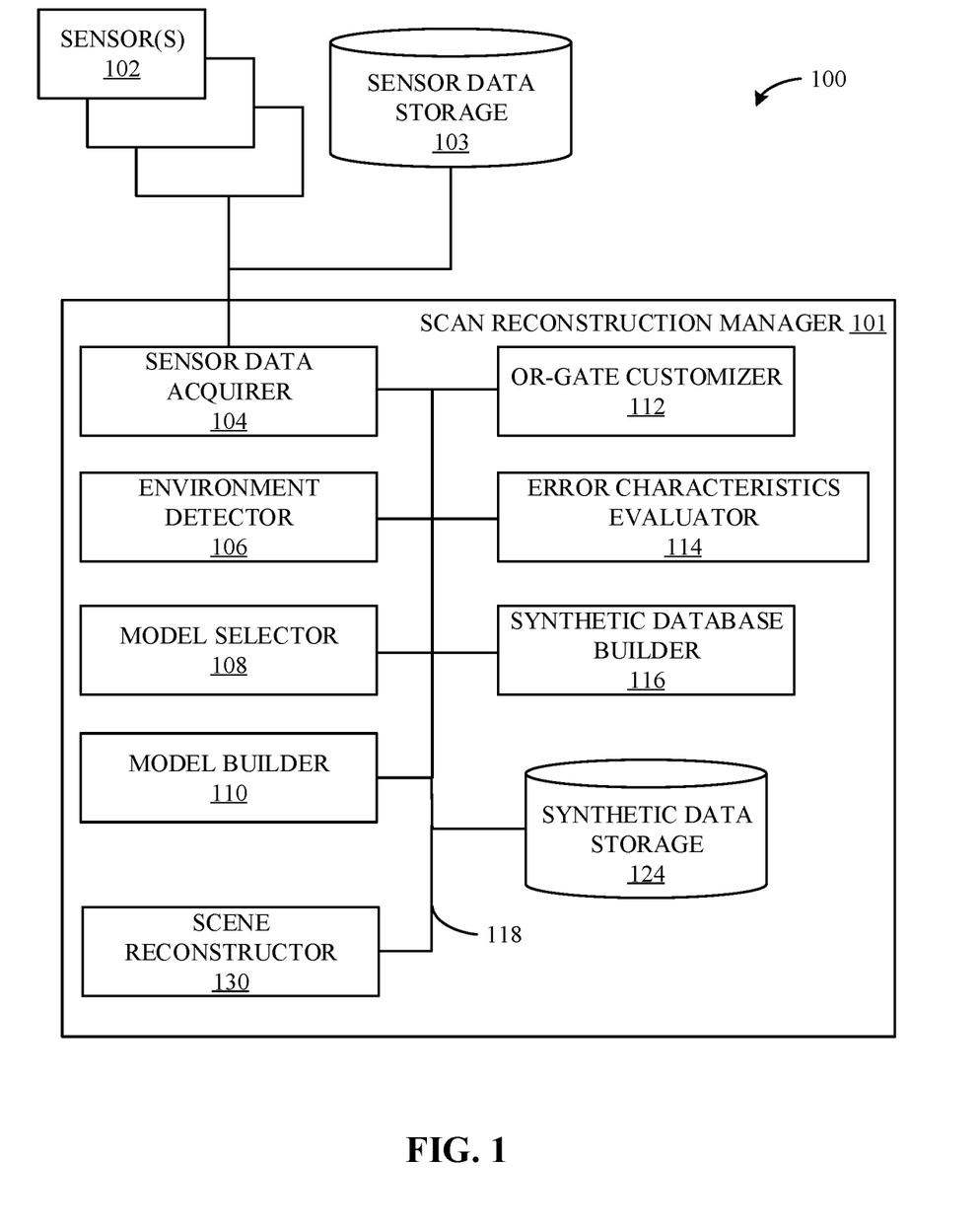
FIG. 1 is a schematic illustration of an example reconstruction system constructed in accordance with the teachings of this disclosure.

FIG. 1 is a schematic illustration of an example reconstruction system 100. In the illustrated example of FIG. 1, the reconstruction system 100 includes an example scan reconstruction manager 101, sensor(s) 102, and sensor data storage (103). The example scan reconstruction manager 101 includes an example sensor data acquirer 104, an example environment detector 106, an example model selector 108, an example model builder 110, an example model adjustor 112, an example error characteristics evaluator 114, an example synthetic database builder 116, an example synthetic data storage 124, and an example scene re-constructor 130. An example bus 118 communicatively connects the aforementioned structure of the example reconstruction manager 101. The example sensor data acquirer 104 is also communicatively connected to an example sensor data source 103 and/or example sensor(s) 102.

The example sensor(s) 102 of the illustrated example of FIG. 1 is implemented by one or more data acquisition sensors such as, for example, one or more Light Detection and Ranging (LiDAR) sensors, image sensors, distance sensors, ultrasonic sensors, etc. In some examples, multiple different types of sensors are used. In examples disclosed herein, the sensor(s) 102 provide data to the sensor data acquirer 104. In some examples, the data from the sensor(s) 102 is stored in the sensor data storage 103. In some examples, sensor data is stored and/or otherwise provided as voxels (volumetric elements) indicative of image information in three-dimensional space. In some other examples, the sensor data is provided as image data which is used to generate a voxel representation. In some examples, the sensor data is provided as a point cloud which is used to generate the voxel representation. In some examples, voxels include binary values indicative of occupancy of a point and/or area in three-dimensional space (e.g., whether a particular space is consumed by an object). In some examples, such voxel information includes additional information such as, for example, color (e.g., RGB (red, green, blue)) data, brightness data, etc.

The example sensor data storage 103 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example sensor data storage 103 may be in any data format such as, for example, binary data, comma delimited data, tab delimited data, structured query language (SQL) structures, etc. While, in the illustrated example, the sensor data storage 103 is illustrated as a single device, the example sensor data storage 103 and/or any other data storage devices described herein may be implemented by any number and/or type(s) of memories. In the illustrated example of FIG. 1, the example sensor data storage 103 stores sensor data (e.g., cached sensor data collected by the sensor(s) 102) and/or ground truth data (e.g., curated sensor data that is known to not include noise).

The example sensor data acquirer 104 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example sensor data acquirer 104 acquires ground truth data and/or sensor data (e.g., images, video, etc.). In some other examples, the sensor data and/or ground truth data is provided as image data, which the example sensor data acquirer 104 uses to generate a voxel representation. In some examples, the sensor data and/or ground truth data is provided as a point cloud which the example sensor data acquirer 104 uses to generate the voxel representation.

The example environment detector 106 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example environment detector 106 identifies characteristics and/or characteristic type(s) of the ground truth data and/or the sensor data. In examples disclosed herein, such characteristics include whether the environment is an urban environment (e.g., a city landscape) or a rural environment are identified. In some examples, further characteristics of the environment may be identified such as, for example, types of buildings and/or architectures typically present in the environment. For example, modern city landscapes/architectures (e.g., San Francisco, New York, etc.) may result in different models than other city landscapes/architectures (e.g., Sienna, Italy; Dublin, Ireland). In some examples, metadata included in the sensor data (e.g., Exchangeable image file format (EXIF) data) may be used to determine a geographic location of the environment.

The example model selector 108 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example model selector 108 selects a synthetic database for use in the scene re-construction based on the environment characteristic(s) identified by the environment detector 106. In examples disclosed herein, the synthetic database represents one or more machine learning models that are to be used when performing scene re-construction.

The example model builder 110 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example model builder 110 splits the ground truth data into training sets. In examples disclosed herein, three training sets are used. However, any other number of training sets may additionally or alternatively be used. In some examples, the training sets each include the same data as the other training sets. Such an approach allows for various levels of noise to be applied to the training sets by the synthetic database builder 116. However, in some other examples, a single training set is used, and progressive amounts of noise are applied to the training set. In examples disclosed herein, the training sets are the same size. However, any size training data may additionally or alternatively be used.

The example model builder 110 trains a model using the training set (including the noise applied by the synthetic database builder 116). In examples disclosed herein, the model is implemented using a convolutional neural network (CNN). However, any other machine learning model architecture may additionally or alternatively be used. In examples disclosed herein, example model builder 110 trains the model using stochastic gradient descent. However, any other training algorithm may additionally or alternatively be used. In examples disclosed herein, with respect to each training set, training is performed until an acceptable level of error between a validation data set (e.g., a portion of the ground truth data and/or training data with noise applied) and the ground truth data is achieved.

The example model builder 110 then determines whether any additional training sets exist and, if so, repeats training until all training sets have been used. In examples disclosed herein, variable amounts of noise may be applied to the various training sets (e.g., by the synthetic database builder 116). For example, in a first iteration, a first amount of noise may be applied to the first training set (e.g., 10% noise), while in a second iteration, a second amount of noise different than the first amount of noise may be applied to the second training set e.g. 20% noise. In examples disclosed herein, three training sets are used having noise values of 10%, 20%, and 50%, respectively. Using increasing amounts of noise improves the convergence of the model, since the model gradually improves on itself in increasingly noisier scenarios.

The example model adjustor 112 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. Once all training sets have been used for generation of the model by the model builder 110, the example model adjustor 112 tailors and/or otherwise augments the model with residual OR-gate connections. Accordingly, in some examples, the model adjustor 112 may be referred to as an OR-gate customizer. As noted above the added OR-gates improve system accuracy by removing spurious inferences. That is, the OR-gate architecture ensures that the end result of a model (e.g., when used in connection with live data), does not result in erroneous voxel data being created. In other words, performance of the system is guaranteed to be no worse than the input data.

Typical CNN techniques operate in a manner analogous to regressions that produce a degree of error. In some traditional approaches, CNN techniques employ a logical AND operation between image input data and one or more convolutional layers. As such, if a noisy and/or otherwise imperfect (e.g., containing errors/voids) input sensor does not contain information for a particular voxel indicative of present structure, and a CNN layer suggests a non-zero probability indicative of present structure, then the logical AND architecture results in a zero-value output. Similarly, if a noisy input included a voxel indicative of structure (e.g., a binary value of "1" in the voxel), but a CNN layer iteration indicates no structure, then the logical AND architecture results in a zero-value output. As such, traditional CNN techniques can result in an output image reconstruction that is worse (e.g., containing more errors when compared to truth data) than the initial input image. This effect is exacerbated in environments where voids in the input sensor data are common.

Figure 2:
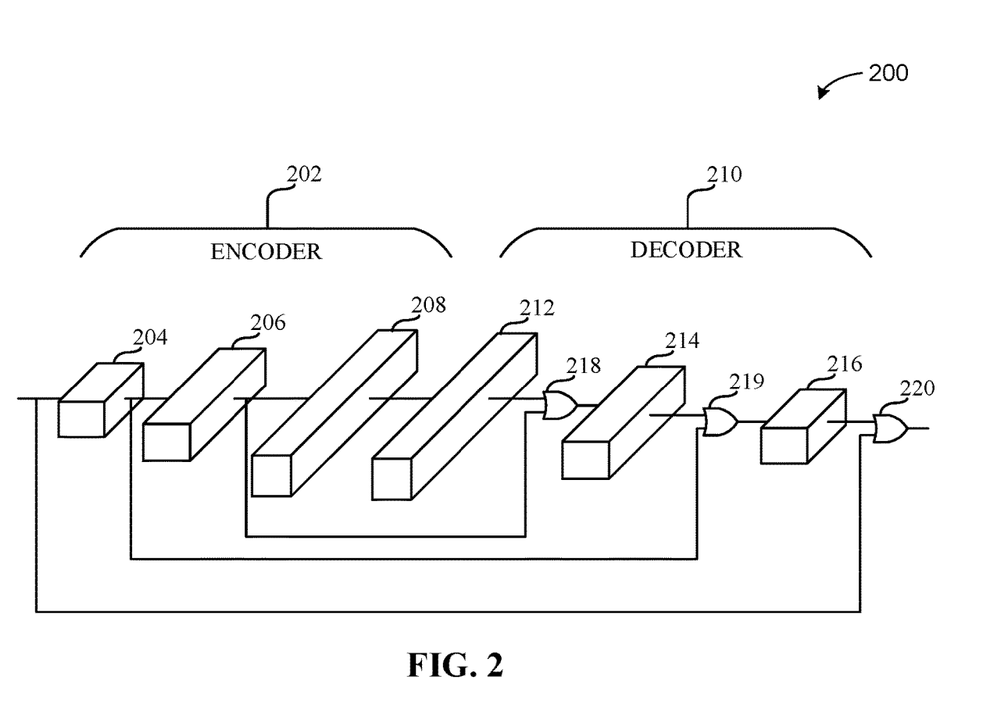
FIG. 2 is an OR-like architecture implemented by the example reconstruction system of FIG. 1 to reconstruct scenes using convolutional neural networks.

Examples disclosed herein improve scene reconstruction by, in part, the example model adjustor 112 employing OR-like gates in residual connections, thereby removing spurious inferences (e.g., false positive identifications). FIG. 2 illustrates an example OR-like architecture 200. In the illustrated example of FIG. 2, the example architecture 200 includes an encoder phase 202 including a first network layer 204, a second network layer 206, and a third network layer 208. The illustrated example of FIG. 2 also includes a decoder phase 210, which includes a corresponding fourth network layer 212, a fifth network layer 214, and a sixth network layer 216. To remove spurious inferences during convolution activity by the example scan reconstruction manager 101, the example architecture 200 includes corresponding OR-gates 218, 219, 220, which accepts inputs associated with image data as well as intermediate convoluted outputs. In some examples, the architecture 200 generates one or more synthetic data sources/models that are tailored in connection with particular nuances of the source image data.

Returning to FIG. 1, the example error characteristics evaluator 114 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example error characteristics evaluator 114 determines typical error characteristics associated with the environment of interest. For example, urban environments (e.g., environments with metallic structures and/or glass windows) may encounter reflections in sensor data. Such reflections may manifest themselves as a voxel that is not occupied (when that voxel should, in fact, have a value of occupied). The error characteristics are used by the example synthetic database builder 116 to apply particular types and/or quantities of error (e.g., noise) to the ground truth data.

The example synthetic database builder 116 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example synthetic database builder 116 injects environment-specific errors/noise to a first training set of the ground truth data. To apply noise to the training set, the example synthetic database builder 116 toggles one or more voxels from an occupied value (e.g., indicating presence of an object a particular location to an unoccupied value (e.g., indicating absence of an object at the particular location). In examples disclosed herein, a percentage of the voxels appearing in the training data are toggled (e.g., 10%, 20%, etc.) However, any other approach for identifying a voxel to be toggled may additionally or alternatively be used. Moreover, in some examples, instead of toggling from an occupied value to an unoccupied value, the synthetic database builder 116 may toggle a voxel from an unoccupied value to an occupied value (e.g. representing noise indicating presence of an object at a particular location when there is no such object at that location). In examples disclosed herein, the noise is applied by the synthetic database builder 116 to voxels in the training data set at random. However, noise may be applied to the voxel in the training data set in any other fashion.

The example synthetic data storage 124 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example synthetic data storage 124 may be in any data format such as, for example, binary data, comma delimited data, tab delimited data, structured query language (SQL) structures, etc. While, in the illustrated example, the synthetic data storage 124 is illustrated as a single device, the example synthetic data storage 124 and/or any other data storage devices described herein may be implemented by any number and/or type(s) of memories. In the illustrated example of FIG. 1, the example synthetic data storage 124 stores environment-specific machine learning models (e.g., synthetic databases) that can be used for scene re-construction.

The example scene re-constructor 130 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. During an inference and/or use phase of the trained model(s), the example scene re-constructor 130 processes sensor data (e.g., sensor data received via the sensor data acquirer 104) using the selected model to generate a re-constructed scene. In this manner, the scene is created using a machine learning model that is tailored to the particular environment represented by the sensor data (e.g., to account for errors expected to occur in the environment being re-constructed). Such tailoring ensures that noise that is particular to that type of environment is considered when analyzing the sensor data. The generated scene may then be used to, for example, facilitate navigation of a drone.

In operation, the example sensor data acquirer 104 acquires sensor data, such as image data from the example sensor data source 103 and/or the example sensors(s) 102. Acquired image data may be associated with specific types of environments that affect image acquisition devices/hardware in different ways. For example, LiDAR systems may exhibit particular errors when collecting spatial data in urban city environments. More specifically, post-modern urban city environments (e.g., San Francisco) may include office buildings and/or skyscrapers that utilize highly reflective materials (e.g., highly reflective glass, highly reflective metal, etc.) that cause the LiDAR sensor(s) to become saturated. However, LiDAR systems may not exhibit such errors to the same degree in traditional cities (e.g., Siena-Italy, Bath-England, etc.) due to, for example, a relatively greater degree of optically-muted building materials. Instead, LiDAR systems may exhibit different types of errors in such environments caused by shadows.

The example environment detector 106 identifies an environment objective associated with the acquired sensor data, and the example model selector 108 selects a synthetic database (from the example synthetic data storage 124) that is associated with the identified environment objective. Environment objectives may include, but are not limited to, circumstances and nuances caused by post-modern urban images, traditional urban images, post-modern residential images, countryside images, etc. Generally speaking, the selected synthetic database includes training data that is relevant to the acquired image data to improve image reconstruction efforts when the acquired image includes voids and/or errors. The example model selector 108 selects a synthetic database and/or data set associated with the identified environment objective, and the example model builder 110 builds a CNN.

The example error characteristics evaluator 114 determines typical error characteristics associated with the environment in which the ground truth data was taken. As described above, in the event the ground truth data is taken in a post-modern urban environment, then the example error characteristics evaluator 114 identifies brightness saturation as a characteristic of interest for LiDAR-based acquisition systems. The example synthetic database builder 116 injects environment-specific errors into the ground truth data and develops an environment-specific model through one or more neural network training operations. As such, the model can be applied to other similarly-situated environments without the need to re-acquire ground-truth data for the alternate environment (e.g., another post-modern urban city that exhibits building materials having a relatively high degree of optical reflectivity). In some examples, the environment may correspond to a type of area that a sensor platform that is to carry the sensor(s) 102 (e.g., a device operating the sensor(s) 102) is expected to operate. For example, the environment may correspond to a type of roadway on which an autonomous vehicle is operating (e.g., a city street, a suburban street, a country road, a highway, etc.).

In some examples, the scan reconstruction manager 101 is implemented at a server. In such an example, additional server resources may then be used to perform training of the machine learning model(s). Moreover, the scan reconstruction manager 101 implemented at the server may then receive sensor data from a sensor platform (e.g., a device operating the sensor(s) 102), and provide a reconstructed scene to the sensor platform. In some examples, the scan reconstruction manager 101 is implemented as a component of the sensor platform and/or is in communication with the sensor platform. Such an approach enables the sensor platform (e.g., a mobile device, an unmanned aerial vehicle (UAV), a drone, industrial equipment, an autonomous vehicle, etc.) to locally process the sensor data and perform environment-specific scene re-construction.

While an example manner of implementing the reconstruction system 100 of FIG. 1 is illustrated in FIGS. 1 and 2, one or more of the elements, processes and/or devices illustrated in FIGS. 1 and/or 2 may be combined, divided, re-arranged, omitted, eliminated and/or implemented in any other way. Further, the example sensor data acquirer 104, the example environment detector 106, the example model selector 108, the example model builder 110, the example model adjustor 112, the example characteristics evaluator 114, the example synthetic database builder 116, the example synthetic data storage 124, the example scene re-constructor 130, and/or, more generally, the example scan reconstruction manager 101 of FIG. 1 may be implemented by hardware, software, firmware and/or any combination of hardware, software and/or firmware. Thus, for example, any of the example sensor data acquirer 104, the example environment detector 106, the example model selector 108, the example model builder 110, the example model adjustor 112, the example characteristics evaluator 114, the example synthetic database builder 116, the example synthetic data storage 124, the example scene re-constructor 130, and/or, more generally, the example scan reconstruction manager 101 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor data acquirer 104, the example environment detector 106, the example model selector 108, the example model builder 110, the example model adjustor 112, the example characteristics evaluator 114, the example synthetic database builder 116, the example synthetic data storage 124, the example scene re-constructor 130, and/or, more generally, the example scan reconstruction manager 101 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example reconstruction system 100 of FIG. 1 may include one or more elements, processes and/or devices in addition to, or instead of, those illustrated in FIGS. 1 and/or 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
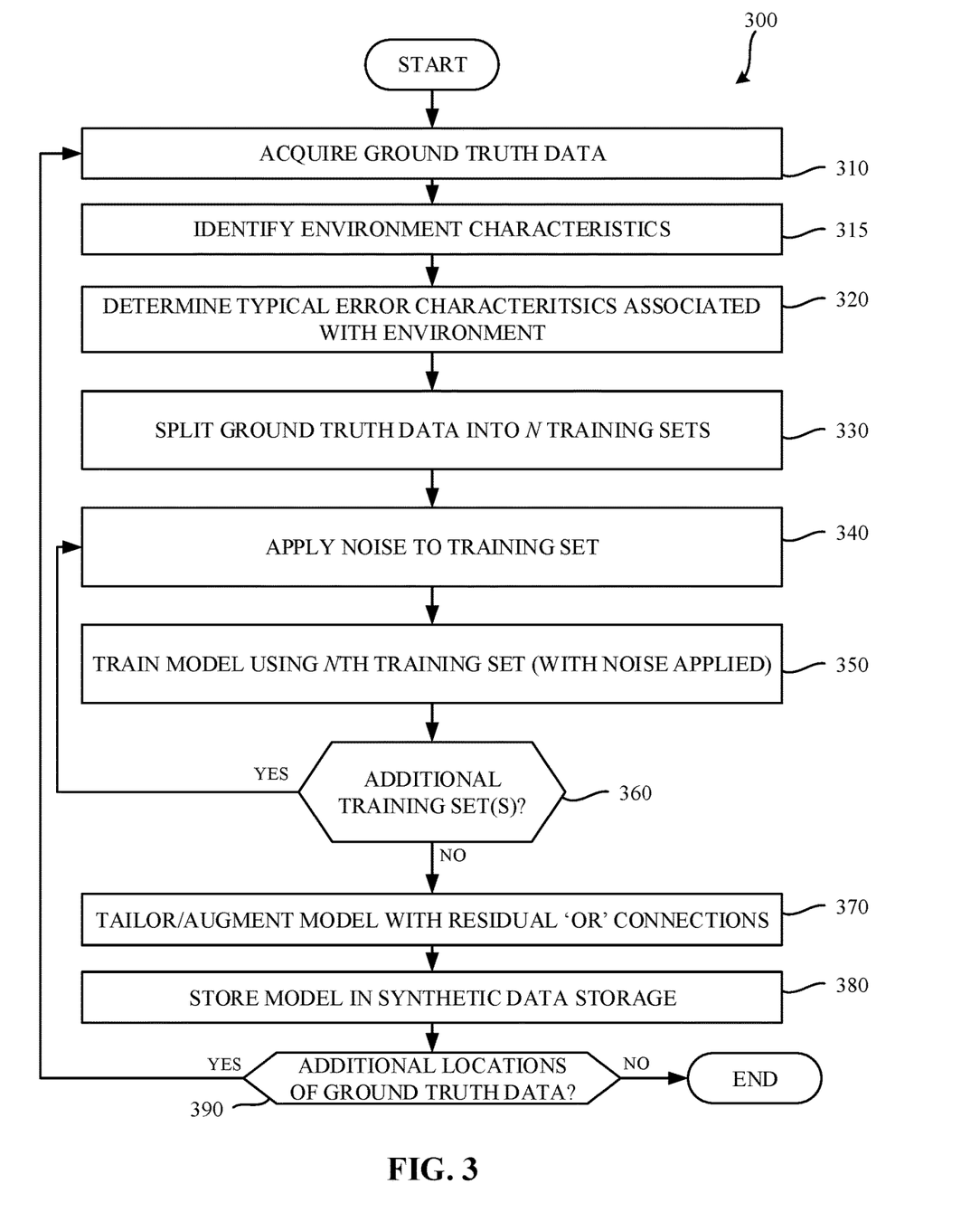
FIG. 3 is a flowchart representative of machine readable instructions which may be executed to implement synthetic database creation.

Flowcharts representative of example hardware logic, machine readable instructions, hardware implemented state machines, and/or any combination thereof for implementing the reconstruction system 100 of FIGS. 1 and/or 2 are shown in FIGS. 3 and/or 4. The machine readable instructions may be an executable program or portion of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIGS. 3 and 4, many other methods of implementing the example reconstruction system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example process 300 of FIG. 3, when executed, results in creation of a machine learning model corresponding to one or more particular environments. The program 300 of FIG. 3 begins when the example sensor data acquirer 104 acquires ground truth data (e.g., images, video, etc.). (Block 310). In examples disclosed herein, the ground truth data represents high-quality images, video, sensor data, etc. of a particular environment (e.g., a city). In some examples, the ground truth data is manually curated and/or edited to ensure that the ground truth data does not include noise. In examples disclosed herein, the ground truth data is stored in the sensor data storage 103. However, the ground truth data may be stored in any other location.

The example environment detector 106 identifies characteristics of the ground truth data. (Block 315). In examples disclosed herein, such characteristics include whether the environment is an urban environment (e.g., a city landscape) or a rural environment. In some examples, further characteristics of the environment may be identified such as, for example, types of buildings and/or architectures typically present in the environment. For example, modern city landscapes/architectures (e.g., San Francisco, New York, etc.) may result in different models than other city landscapes/architectures (e.g., Sienna, Italy; Dublin, Ireland). In some examples, metadata included in the sensor data (e.g., Exchangeable image file format (EXIF) data) may be used to determine a geographic location of the environment.

The example error characteristics evaluator 114 determines typical error characteristics associated with the environment of interest. (Block 320). For example, urban environments (e.g., environments with metallic structures and/or glass windows) may encounter reflections in sensor data. Such reflections may manifest themselves as a voxel that is not occupied (when that voxel should, in fact, have a value of occupied). The example model builder 110 splits the ground truth data into training sets. (Block 330). In examples disclosed herein, three training sets are used. However, any other number of training sets may additionally or alternatively be used. In some examples, the training sets each include the same data as the other training sets. Such an approach allows for various levels of noise to be applied to the training sets. However, in some other examples, a single training set is used, and progressive amounts of noise are applied to the training set. In examples disclosed herein, the training sets are the same size. However any size training data may additionally or alternatively be used.

The example synthetic database builder 116 injects environment-specific errors/noise to a first training set of the ground truth data. (Block 340). To apply noise to the training set, one or more voxels are toggled from an occupied value (e.g., indicating presence of an object a particular location to an unoccupied value (e.g., indicating absence of an object at the particular location). In examples disclosed herein, a percentage of the voxels appearing in the training data are toggled (e.g., 10%, 20%, etc.) However, any other approach for identifying a voxel to be toggled may additionally or alternatively be used. Moreover, in some examples, instead of toggling from an occupied value to an unoccupied value, a voxel may be toggled from an unoccupied value to an occupied value (e.g. representing noise indicating presence of an object at a particular location when there is no such object at that location). In examples disclosed herein, the noise is applied to voxels in the training data set at random. However, noise may be applied to the voxel in the training data set in any other fashion.

The example model builder 110 trains a model using the training set. (Block 350). In examples disclosed herein, example model builder 110 trains the model using stochastic gradient descent. However, any other training algorithm may additionally or alternatively be used. In examples disclosed herein, training is performed until an acceptable level of error between a validation data set (e.g., a portion of the ground truth data and/or training data with noise applied) and the ground truth data is achieved.

The example model builder 110 then determines whether any additional training sets exist. (Block 360). If additional training sets exist, control returns to block 340 where the example process of blocks 340 through 360 are repeated until all training sets have been used. In examples disclosed herein, variable amounts of noise may be applied to the various training sets (e.g., at block 340). For example, in a first iteration, a first amount of noise may be applied to the first training set (e.g., 10% noise), while in a second iteration, a second amount of noise different than the first amount of noise may be applied to the second training set e.g. 20% noise. In examples disclosed herein, three training sets are used having noise values of 10%, 20%, and 50%, respectively. Using increasing amounts of noise improves the convergence of the model, since the model gradually improves on itself in increasingly noisier scenarios.

Once all training sets have been used for generation of the model (e.g., block 360 returns a result of NO), the example model adjustor 112 tailors and/or otherwise augments the model with residual OR-gate connections. (Block 370). As noted above the added OR-gates improve system accuracy by removing spurious inferences. That is, the OR-gate architecture ensures that the end result of a model (e.g., when used in connection with live data), does not result in erroneous voxel data being created. In other words, performance of the system is guaranteed to be no worse than the input data.

The example synthetic database builder 116 then stores the model in the synthetic data storage 124. (Block 380). The example model is stored in connection with the environment characteristics identified in connection with block 315. Storing the model in connection with the environment characteristics (identified at block 315) later allows various models to be selected for use based on the environment. The example synthetic database builder 116 then determines whether additional locations of ground truth data (e.g., alternate environments) exist. (Block 390). If additional locations of ground truth data accessed (e.g., block 390 returns a result of YES), the example process of FIG. 3 is repeated until such other locations of ground truth data have been processed (e.g., models created). Once the additional locations of the ground truth data have been processed (e.g., block 390 returns a result of NO), the example process of FIG. 3 terminates. The example process of FIG. 3 may be repeated upon, for example, additional ground truth data being made available, upon an instruction (e.g., from a user, from an administrator, etc.) to perform re-training, etc.

Figure 4:
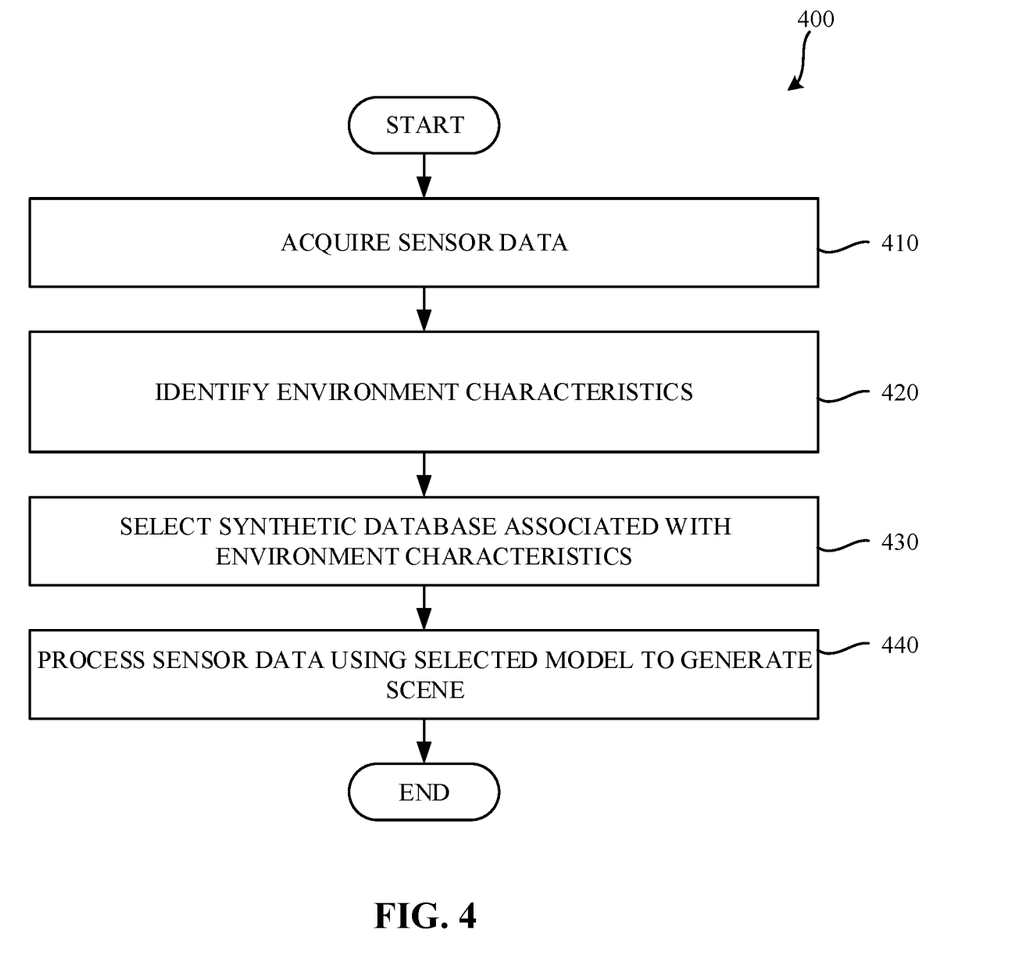
FIG. 4 is a flowchart representative of machine readable instructions which may be executed to implement scene reconstruction.

The example process 400 of FIG. 4, when executed, results in use of a machine learning model corresponding to an environment. The program 400 of FIG. 4 begins at block 410, where the example sensor data acquirer 104 acquires sensor data. (Block 410). In examples disclosed herein, the sensor data represents live sensor data (e.g., from one or more sensors). In some examples, the sensor data is obtained from a drone and/or other unmanned aerial vehicle (UAV)

that is navigating in an environment. In some examples, the scan reconstruction manager 101 may be implemented locally to the drone such that the sensor data is processed on-board the drone. In some other examples, the sensor data may be transmitted to a remote location (e.g., a server) for processing.

The example environment detector 106 identifies an environment characteristic and/or nuances that may be associated with a particular environment. (Block 420). In examples disclosed herein, the environment characteristic represents information (e.g., metadata) about the environment to be re-constructed. In examples disclosed herein, such characteristics include whether the environment is an urban environment (e.g., a city landscape) or a rural environment. In some examples, further characteristics of the environment may be identified such as, for example, types of buildings and/or architectures typically present in the environment. For example, modern city landscapes/architectures (e.g., San Francisco, New York, etc.) may result in different models than other city landscapes/architectures (e.g., Sienna, Italy; Dublin, Ireland). In some examples, global positioning data (GPS) may be used to determine a location and/or environment to which the sensor data corresponds.

Using the identified environment characteristic(s), the example model selector 108 selects a synthetic database. (Block 430). The example scene re-constructor 130 then processes the sensor data using the selected model to generate the scene. (Block 440). In this manner, the scene can be created using a machine learning model that is tailored to the particular environment represented by the sensor data. Such tailoring ensures that noise that is particular to that type of environment is considered when analyzing the sensor data. The generated scene may then be used to, for example, facilitate navigation of a drone.

Figure 5:
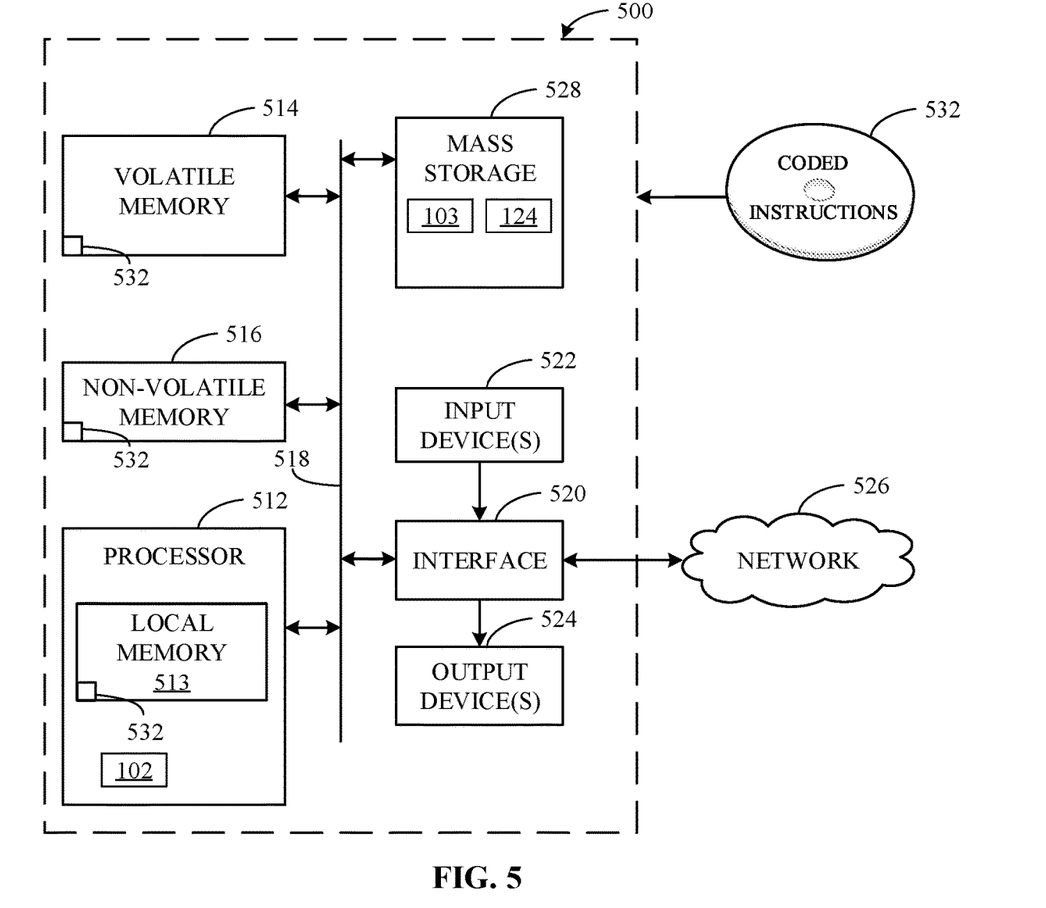
FIG. 5 is a block diagram of an example processing platform structured to execute the instructions of FIGS. 3 and/or 4 to implement the example reconstruction system of FIGS. 1 and 2.

FIG. 5 is a block diagram of an example processor platform 500 structured to execute the instructions of FIGS. 3 and/or 4 to implement the reconstruction system 100 of FIGS. 1 and 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example scan reconstruction manager 101 and components/structure contained therein.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 3 and 4 may be stored in the mass storage device 528, in the volatile memory 514, in the non-volatile memory 516, and/or on a removable non-transitory computer readable storage medium such as a CD or DVD.

From the foregoing, it will be appreciated that example systems, methods, apparatus and articles of manufacture have been disclosed that improve three-dimensional scan reconstruction of image and/or video data by utilizing or-like structures in the convolution process of a neural network. Additionally, examples disclosed herein avoid time consuming, processor intensive and memory-intensive requirements to obtain ground-truth data for regions of interest that exhibit similar environmental characteristics. For example, because both San Francisco and Chicago exhibit similar environmental characteristics due to their post-modern urban features (e.g., skyscrapers with reflective surfaces), a ground-truth data acquisition effort only needs to be performed once in one of these two localities. The resulting model can then be used in the other similarly situated localities.

It is noted that this patent claims priority from U.S. Provisional Patent Application Ser. No. 62/674,462, which was filed on May 21, 2018, and is hereby incorporated by reference in its entirety.

Methods, apparatus, systems and articles of manufacture to reconstruct scenes using convolutional neural networks are disclosed herein. Further examples and combinations thereof include the following:

Example 1 includes an apparatus for generating models for scene re-construction, the apparatus comprising a sensor data acquirer to acquire ground truth data representing an environment, an environment detector to identify an environmental characteristic of the environment, a synthetic database builder to apply noise to the ground truth data to form a training set, a model builder to train a machine learning model using the training set and the ground truth data, and a model adjustor to modify the machine learning model to include residual OR-gate connections intermediate respective layers of the machine learning model, wherein the synthetic database builder is further to store the machine learning model in association with the environmental characteristic of the environment.

Example 2 includes the apparatus of example 1, further including an environment characteristics evaluator to determine an error characteristic associated with the environmental characteristic, the synthetic database builder to apply the noise to the ground truth data based on the error characteristic.

Example 3 includes the apparatus of any one of examples 1 or 2, wherein the synthetic database builder is to split the ground truth data into a plurality of training sets, and apply different amounts of noise to respective ones of the plurality of training sets, the model builder to train the machine learning model based on the plurality of training sets.

Example 4 includes the apparatus of example 3, wherein the model builder is to train the machine learning model using training sets with increasing amounts of noise.

Example 5 includes the apparatus of any one of examples 1 through 4, wherein the environmental characteristic includes an amount of optical reflectivity in the environment.

Example 6 includes the apparatus of any one of examples 1 through 5, wherein the machine learning model is implemented using a convolutional neural network (CNN).

Example 7 includes the apparatus of any one of examples 1 through 6, wherein the environmental characteristic is a first environmental characteristic, the sensor data acquirer is to access sensor data, the environment detector is to identify a second environmental characteristic of an environment represented by the sensor data, and further including a model selector to select the machine learning model based on the second environmental characteristic matching the first environmental characteristic, and a scene re-constructor to process the sensor data using the selected machine learning model to create a scene.

Example 8 includes the apparatus of example 7, wherein the environment detector is to identify the second environmental characteristic is based on metadata accessed in connection with the sensor data.

Example 9 includes the apparatus of any one of examples 1 through 8, further including synthetic data storage to store the machine learning model.

Example 10 includes At least one non-transitory computer readable medium comprising instructions that, when executed, cause at least one processor to at least acquire ground truth data representing an environment, identify an environmental characteristic of the environment, apply noise to the ground truth data to form a training set, train a machine learning model using the training set and the ground truth data, modify the machine learning model to include residual OR-gate connections intermediate respective layers of the machine learning model, and store the machine learning model in association with the environmental characteristic of the environment.

Example 11 includes the at least one non-transitory computer readable medium of example 10, wherein the instructions, when executed, further cause the at least one processor to determine determining an error characteristic associated with the environmental characteristic, and wherein the noise applied to the ground truth data is based on the error characteristic.

Example 12 includes the at least one non-transitory computer readable medium of any one of examples 10 or 11, wherein the instructions, when executed, further cause the at least one processor to split the ground truth data into a plurality of training sets, apply different amounts of noise to respective ones of the plurality of the training sets, and train the machine learning model based on the plurality of training sets.

Example 13 includes the at least one non-transitory computer readable medium of example 12, wherein the instructions, when executed, further cause the at least one processor to train the machine learning model using training sets with increasing amounts of noise.

Example 14 includes the at least one non-transitory computer readable medium of any one of examples 10 through 14, wherein the environmental characteristic includes an amount of optical reflectivity in the environment.

Example 15 includes the at least one non-transitory computer readable medium of any one of examples 10 through 14, wherein the machine learning model is implemented using a convolutional neural network (CNN).

Example 16 includes the at least one non-transitory computer readable medium of any one of examples 10 through 15, wherein the environmental characteristic is a first environmental characteristic, and the instructions, when executed, further cause the at least one processor to access sensor data, identify a second environmental characteristic of an environment represented by the sensor data, select the machine learning model based on the second environmental characteristic matching the first environmental characteristic, and process the sensor data using the selected machine learning model to re-create a scene.

Example 17 includes the at least one non-transitory computer readable medium of example 16, wherein the instructions, when executed, further cause the at least one processor to identify of the second environmental characteristic based on metadata accessed in connection with the sensor data.

Example 18 includes a method for generating models for scene re-construction, the method comprising acquiring ground truth data representing an environment, identifying an environmental characteristic of the environment, applying noise to the ground truth data to form a training set, training a machine learning model using the training set and the ground truth data, modifying the machine learning model to include residual OR-gate connections intermediate respective layers of the machine learning model, and storing the machine learning model in association with the environmental characteristic of the environment.

Example 19 includes the method of example 18, further including determining an error characteristic associated with the environmental characteristic, and wherein the noise applied to the ground truth data is based on the error characteristic.

Example 20 includes the method of any one of examples 18 through 20, further including splitting the ground truth data into a plurality of training sets, wherein the applying of the noise to the training sets includes applying different amounts of noise to the respective training sets, and the training of the machine learning model is performed based on the plurality of training sets.

Example 21 includes the method of example 20, wherein the training of the machine learning model is performed using training sets with increasing amounts of noise.

Example 22 includes the method of any one of examples 18 through 22, wherein the environmental characteristic includes an amount of optical reflectivity in the environment.

Example 23 includes the method of any one of examples 18 through 23, wherein the machine learning model is implemented using a convolutional neural network (CNN).

Example 24 includes the method of any one of examples 18 through 23, wherein the environmental characteristic is a first environmental characteristic, and further including accessing sensor data, identifying a second environmental characteristic of an environment represented by the sensor data, selecting the machine learning model based on the second environmental characteristic matching the first environmental characteristic, and processing the sensor data using the selected machine learning model to re-create a scene.

Example 25 includes the method of example 24, wherein the identifying of the second environmental characteristic is based on metadata accessed in connection with the sensor data.

Example 26 includes an apparatus for re-constructing a scene, the apparatus comprising means for acquiring ground truth data representing an environment, means for identifying an environmental characteristic of the environment, means for applying noise to the ground truth data to form a training set, means for training a machine learning model using the training set and the ground truth data, and means for modifying the machine learning model to include residual OR-gate connections intermediate respective layers of the machine learning model, the means for applying to store the machine learning model in association with the environmental characteristic of the environment. In some examples, the means for acquiring may be implemented by the example sensor data acquirer 104. In some examples, the means for identifying may be implemented by the example environment detector 106. In some examples, the example means for applying may be implemented by the example synthetic database builder 116. In some examples, the example means for training may be implemented by the example model builder 110. In some examples, the example means for modifying may be implemented by the example model adjustor 112.

Example 27 includes the apparatus of example 26, further including means for determining a typical error characteristic associated with the environmental characteristic, and wherein the means for applying noise is to apply noise to the ground truth data based on the error characteristic. In some examples, the means for determining may be implemented by the environmental characteristics evaluator 114.

Example 28 includes the apparatus of any one of examples 26 or 27, wherein the means for applying is to split the ground truth data into a plurality of training sets, the means for applying is to apply different amounts of noise to the respective training sets, and the means for training is to perform the training based on the plurality of training sets.

Example 29 includes the apparatus of example 28, wherein the means for training is to train the machine learning model using training sets with increasing amounts of noise applied.

Example 30 includes the apparatus of any one of examples 26 through 29, wherein the environmental characteristic includes an amount of optical reflectivity expected in the environment.

Example 31 includes the apparatus of any one of examples 26 through 30, wherein the machine learning model is implemented using a convolutional neural network (CNN).

Example 32 includes the apparatus of any one of examples 26 through 31, wherein the environmental characteristic is a first environmental characteristic, and further including means for accessing sensor data, wherein the means for identifying is to identify a second environmental characteristic of an environment represented by the sensor data, means for selecting the machine learning model based on the second environmental characteristic matching the first environmental characteristic, and means for processing the sensor data using the selected machine learning model to re-create a scene.

Example 33 includes the apparatus of example 32, wherein the means for identifying is to identify the second environmental characteristic based on metadata accessed in connection with the sensor data. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for generating a model for scene re-construction, the apparatus comprising:
   interface circuitry;
   machine-readable instructions; and
   at least one processor circuit to be programmed by the machine-readable instructions to:
   acquire ground truth data representing a first environment;
   identify a first degree of optical reflectivity of the first environment;
   apply noise to the ground truth data based on the first degree of optical reflectivity to form a training set;
   train a machine learning model using the training set and the ground truth data;
   modify the machine learning model to include residual OR-gate connections intermediate respective layers of the machine learning model;
   store the machine learning model in association with the first degree of optical reflectivity of the first environment;
   access sensor data;
   identify a second degree of optical reflectivity of a second environment represented by the sensor data;
   select the machine learning model based on the second degree of optical reflectivity matching the first degree of optical reflectivity; and
   process the sensor data using the selected machine learning model to create a scene.

2. The apparatus of claim 1, wherein one or more of the at least one processor circuit is to determine an error characteristic associated with the first degree of optical reflectivity, and apply the noise to the ground truth data based on the error characteristic.

3. The apparatus of claim 1, wherein one or more of the at least one processor circuit is to split the ground truth data into a plurality of training sets and apply different amounts of noise to respective training sets, and train the machine learning model based on the plurality of training sets.

4. The apparatus of claim 3, wherein one or more of the at least one processor circuit is to train the machine learning model using training sets with increasing amounts of noise.

5. The apparatus of claim 1, wherein the machine learning model is implemented using a convolutional neural network (CNN).

6. The apparatus of claim 1, wherein one or more of the at least one processor circuit is to identify the second degree of optical reflectivity based on metadata accessed in connection with the sensor data.

7. The apparatus of claim 1, further including data storage to store the machine learning model.

8. At least one non-transitory computer readable medium comprising instructions to cause at least one processor circuit to at least:
 acquire ground truth data representing a first environment;
 identify a first degree of optical reflectivity of the first environment;
 apply noise to the ground truth data based on the first degree of optical reflectivity to form a training set;
 train a machine learning model using the training set and the ground truth data;
 modify the machine learning model to include residual OR-gate connections intermediate respective layers of the machine learning model;
 store the machine learning model in association with the first degree of optical reflectivity of the first environment;
 access sensor data;
 identify a second degree of optical reflectivity of a second environment represented by the sensor data;
 select the machine learning model based on the second degree of optical reflectivity matching the first degree of optical reflectivity; and
 process the sensor data using the selected machine learning model to create a scene.

9. The at least one non-transitory computer readable medium of claim 8, wherein the instructions are to cause the at least one processor circuit to determine determining an error characteristic associated with the first degree of optical reflectivity, and wherein the noise applied to the ground truth data is based on the error characteristic.

10. The at least one non-transitory computer readable medium of claim 8, wherein the instructions are to cause the at least one processor circuit to split the ground truth data into a plurality of training sets, apply different amounts of noise to respective ones of the plurality of the training sets, and train the machine learning model based on the plurality of training sets.

11. The at least one non-transitory computer readable medium of claim 10, wherein the instructions are to cause the at least one processor circuit to train the machine learning model using training sets with increasing amounts of noise.

12. The at least one non-transitory computer readable medium of claim 8, wherein the machine learning model is implemented using a convolutional neural network (CNN).

13. The at least one non-transitory computer readable medium of claim 8, wherein the instructions are to cause the at least one processor circuit to identify the second degree of optical reflectivity based on metadata accessed in connection with the sensor data.

14. A method for generating models for scene re-construction, the method comprising:
 acquiring ground truth data representing a first environment;
 identifying a first amount of optical reflectivity of the first environment;
 applying noise to the ground truth data based on the first amount of optical reflectivity to form a training set;
 training a machine learning model using the training set and the ground truth data;
 modifying the machine learning model to include residual OR-gate connections intermediate respective layers of the machine learning model;
 storing the machine learning model in association with the first amount of optical reflectivity of the first environment;
 accessing sensor data;
 identifying a second amount of optical reflectivity of a second environment represented by the sensor data;
 selecting the machine learning model based on the second amount of optical reflectivity matching the first amount of optical reflectivity; and
 processing the sensor data using the selected machine learning model to create a scene.

15. The method of claim 14, further including determining an error characteristic associated with the first amount of optical reflectivity, and wherein the noise applied to the ground truth data is based on the error characteristic.

16. The method of claim 14, further including splitting the ground truth data into a plurality of training sets, wherein the applying of the noise to the training sets includes applying different amounts of noise to the respective training sets, and the training of the machine learning model is performed based on the plurality of training sets.

17. The method of claim 16, wherein the training of the machine learning model is performed using training sets with increasing amounts of noise.

18. The method of claim 14, wherein the machine learning model is implemented using a convolutional neural network (CNN).

* * * * *